(12) United States Patent
Caterino et al.

(10) Patent No.: US 10,482,698 B2
(45) Date of Patent: Nov. 19, 2019

(54) INVISIBLE INDICATION OF DURESS VIA WEARABLE

(71) Applicant: ASSA ABLOY AB, Stockholm (SE)

(72) Inventors: Mark Anthony Caterino, Prospect, CT (US); Fredrik Carl Stefan Einberg, Huddinge (SE); Philip Hoyer, Richmond (GB); Masha Leah Davis, Austin, TX (US)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/569,105

(22) PCT Filed: May 2, 2016

(86) PCT No.: PCT/IB2016/000669
§ 371 (c)(1),
(2) Date: Oct. 25, 2017

(87) PCT Pub. No.: WO2016/178085
PCT Pub. Date: Nov. 10, 2016

(65) Prior Publication Data
US 2018/0122219 A1    May 3, 2018

Related U.S. Application Data

(60) Provisional application No. 62/156,035, filed on May 1, 2015, provisional application No. 62/156,030, filed
(Continued)

(51) Int. Cl.
*G08B 1/08* (2006.01)
*G07C 9/00* (2006.01)
(Continued)

(52) U.S. Cl.
CPC ......... *G07C 9/00309* (2013.01); *G06F 1/163* (2013.01); *G07C 9/00087* (2013.01);
(Continued)

(58) Field of Classification Search
CPC .. G08B 25/016; G08B 7/066; G07C 9/00087; G07C 9/00309; G07C 9/00111;
(Continued)

(56) References Cited

U.S. PATENT DOCUMENTS 6,374,356 B1    4/2002    Daigneault et al.
6,719,200 B1    4/2004    Wiebe
(Continued)

FOREIGN PATENT DOCUMENTS

EP    1710974    10/2005
EP    1760671    3/2007
(Continued)

OTHER PUBLICATIONS

International Search Report for International Patent Application No. PCT/IB2016/000669, dated Aug. 1, 2016, 6 pages.
(Continued)

*Primary Examiner* — Zhen Y Wu
(74) *Attorney, Agent, or Firm* — Sheridan Ross P.C.

(57) ABSTRACT

Methods, devices, and systems are provided for invisibly indicating duress via a wearable device. In response to determining a duress condition associated with a user exists, a duress signal is provided to components of the access control system. The duress signal can identify a user associated with the duress, a duress type, and even include a location associated with the duress condition. An alert of the duress condition can be distributed to one or more devices in the access control system. These devices may be associated with users of the system and the alert may be configured to silently inform the users of the duress condition.

19 Claims, 6 Drawing Sheets

Related U.S. Application Data on May 1, 2015, provisional application No. 62/161,640, filed on May 14, 2015, provisional application No. 62/162,273, filed on May 15, 2015, provisional application No. 62/164,099, filed on May 20, 2015, provisional application No. 62/167,136, filed on May 27, 2015, provisional application No. 62/167,172, filed on May 27, 2015, provisional application No. 62/197,985, filed on Jul. 28, 2015, provisional application No. 62/197,945, filed on Jul. 28, 2015, provisional application No. 62/198,240, filed on Jul. 29, 2015.

(51) Int. Cl.

| | | |
|---|---|---|
| H04L 29/06 | (2006.01) | |
| H04W 12/08 | (2009.01) | |
| H04L 9/32 | (2006.01) | |
| H04W 12/06 | (2009.01) | |
| G08B 7/06 | (2006.01) | |
| G08B 25/01 | (2006.01) | |
| H04W 12/04 | (2009.01) | |
| G06F 1/16 | (2006.01) | |
| H04B 1/3827 | (2015.01) | |
| G06F 21/34 | (2013.01) | |
| H04W 4/80 | (2018.01) | |
| G06K 9/00 | (2006.01) | |
| H04W 88/02 | (2009.01) | |
| H04W 12/00 | (2009.01) | |

(52) U.S. Cl.
CPC ...... *G07C 9/00111* (2013.01); *G07C 9/00174* (2013.01); *G07C 9/00571* (2013.01); *G08B 7/066* (2013.01); *G08B 25/016* (2013.01); *H04B 1/385* (2013.01); *H04L 9/3226* (2013.01); *H04L 63/0428* (2013.01); *H04L 63/062* (2013.01); *H04L 63/083* (2013.01); *H04L 63/0853* (2013.01); *H04L 63/0861* (2013.01); *H04L 63/0876* (2013.01); *H04L 63/108* (2013.01); *H04W 12/04* (2013.01); *H04W 12/06* (2013.01); *H04W 12/08* (2013.01); *G06F 21/34* (2013.01); *G06K 9/00885* (2013.01); *G07C 9/00563* (2013.01); *G07C 2009/00769* (2013.01); *H04L 2463/121* (2013.01); *H04W 4/80* (2018.02); *H04W 12/00503* (2019.01); *H04W 12/00508* (2019.01); *H04W 88/02* (2013.01)

(58) Field of Classification Search
CPC ............ G07C 9/00174; G07C 9/00571; G07C 9/00563; G07C 2009/00769; H04W 12/06; H04W 12/08; H04W 12/04; H04W 4/80; H04W 12/00503; H04W 12/00508; H04W 88/02; G06F 1/163; G06F 21/34; H04B 1/385; H04B 9/3226; H04B 63/0428; H04B 63/062; H04B 63/083; H04B 63/0853; H04B 63/0861; H04B 63/0876; H04B 63/108; G06K 9/00885; H04L 2463/121
USPC .................................................. 340/539.11
See application file for complete search history.

(56) References Cited

U.S. PATENT DOCUMENTS

| | | | |
|---|---|---|---|
| 6,766,450 B2 | 7/2004 | Micali | |
| 7,706,778 B2 | 4/2010 | Lowe | |
| 8,074,271 B2 | 12/2011 | Davis et al. | |
| 9,269,208 B2* | 2/2016 | Burke | G06F 21/32 |
| 9,280,860 B2* | 3/2016 | Malhotra | A61B 5/1172 |
| 9,344,436 B1* | 5/2016 | Sheng | H04W 4/021 |
| 9,391,986 B2* | 7/2016 | Schultz | H04L 9/3231 |
| 9,672,727 B1* | 6/2017 | Alexander | G08B 25/016 |
| 9,942,222 B1* | 4/2018 | Fenton | H04L 63/0853 |
| 2002/0178385 A1 | 11/2002 | Dent et al. | |
| 2003/0141977 A1* | 7/2003 | Brown | G08B 25/016 |
| | | | 340/574 |
| 2003/0144952 A1* | 7/2003 | Brown | G06Q 20/04 |
| | | | 705/40 |
| 2005/0151640 A1 | 7/2005 | Hastings | |
| 2007/0024417 A1 | 2/2007 | Gerstenkorn | |
| 2008/0068183 A1* | 3/2008 | Diamant | G06F 21/31 |
| | | | 340/574 |
| 2008/0284564 A1 | 11/2008 | Leitch | |
| 2010/0122350 A1* | 5/2010 | Munje | H04M 1/66 |
| | | | 726/28 |
| 2010/0274100 A1 | 10/2010 | Behar et al. | |
| 2012/0112901 A1 | 5/2012 | Chasko | |
| 2012/0126940 A1* | 5/2012 | Coggill | G06F 21/32 |
| | | | 340/5.54 |
| 2012/0311675 A1 | 12/2012 | Ham et al. | |
| 2013/0015947 A1 | 1/2013 | Best | |
| 2013/0024374 A1* | 1/2013 | Weiss | G06F 21/32 |
| | | | 705/42 |
| 2013/0044055 A1 | 2/2013 | Karmarkar et al. | |
| 2013/0060577 A1 | 3/2013 | Debusk et al. | |
| 2013/0086375 A1 | 4/2013 | Lyne et al. | |
| 2013/0091561 A1* | 4/2013 | Bruso | G06F 21/31 |
| | | | 726/16 |
| 2013/0095802 A1 | 4/2013 | Wang | |
| 2013/0124855 A1 | 5/2013 | Varadarajan et al. | |
| 2013/0257613 A1* | 10/2013 | Jarman | G08B 25/016 |
| | | | 340/539.11 |
| 2013/0324081 A1 | 12/2013 | Gargi et al. | |
| 2014/0091903 A1 | 4/2014 | Birkel et al. | |
| 2014/0120905 A1 | 5/2014 | Kim | |
| 2014/0225713 A1 | 8/2014 | McIntyre et al. | |
| 2014/0282877 A1* | 9/2014 | Mahaffey | H04L 63/0853 |
| | | | 726/3 |
| 2014/0282927 A1 | 9/2014 | McLaughlin et al. | |
| 2014/0359722 A1* | 12/2014 | Schultz | H04L 63/0861 |
| | | | 726/5 |
| 2014/0373111 A1 | 12/2014 | Moss et al. | |
| 2015/0028996 A1 | 1/2015 | Agrafioti et al. | |
| 2015/0067803 A1 | 3/2015 | Alduaiji | |
| 2015/0121465 A1 | 4/2015 | Berns et al. | |
| 2015/0140964 A1* | 5/2015 | Horton | H04W 12/08 |
| | | | 455/410 |
| 2015/0161876 A1* | 6/2015 | Castillo | G08B 21/0453 |
| | | | 340/539.11 |
| 2015/0172897 A1* | 6/2015 | Mariathasan | H04W 4/90 |
| | | | 455/404.1 |
| 2015/0309767 A1 | 10/2015 | Osoinach et al. | |
| 2016/0036965 A1 | 2/2016 | Kim | |
| 2016/0274556 A1* | 9/2016 | Murphy | G05B 19/048 |

FOREIGN PATENT DOCUMENTS

| | | |
|---|---|---|
| EP | 1895445 | 3/2008 |
| EP | 1926038 | 5/2008 |
| EP | 2434461 | 3/2012 |
| EP | 2469816 | 6/2012 |
| EP | 2493232 | 8/2012 |
| EP | 2620919 | 7/2013 |
| EP | 2809046 | 12/2014 |
| GB | 2402840 | 12/2004 |
| WO | WO 2004/025545 | 3/2004 |
| WO | WO 2005/024549 | 3/2005 |
| WO | WO 2007/121414 | 10/2007 |
| WO | WO 2009/089208 | 7/2009 |
| WO | WO 2009/127984 | 10/2009 |
| WO | WO 2009/143415 | 11/2009 |
| WO | WO 2012/113080 | 8/2012 |
| WO | WO 2013/118454 | 8/2013 |
| WO | WO 2014/098755 | 6/2014 |
| WO | WO 2014/172325 | 10/2014 |

(56) References Cited

FOREIGN PATENT DOCUMENTS

| WO | WO 2014/191537 | 12/2014 |
|----|----------------|---------|
| WO | WO 2016/177666 | 11/2016 |
| WO | WO 2016/177668 | 11/2016 |
| WO | WO 2016/177669 | 11/2016 |
| WO | WO 2016/177671 | 11/2016 |
| WO | WO 2016/177672 | 11/2016 |
| WO | WO 2016/177673 | 11/2016 |
| WO | WO 2016/177674 | 11/2016 |
| WO | WO 2016/178081 | 11/2016 |
| WO | WO 2016/178082 | 11/2016 |

OTHER PUBLICATIONS

Written Opinion for International Patent Application No. PCT/IB2016/000669, dated Aug. 1, 2016, 6 pages.
Second Written Opinion for International Patent Application No. PCT/IB2016/000669, dated Apr. 6, 2017, 6 pages.
International Search Report and Written Opinion for International (PCT) Patent Application No. PCT/EP2016/059746, dated Jul. 22, 2016 11 pages.
Second Written Opinion for International (PCT) Patent Application No. PCT/EP2016/059746, dated Mar. 31, 2017 6 pages.
International Preliminary Report on Patentability for International (PCT) Patent Application No. PCT/EP2016/059746, dated Jul. 26, 2017 17 pages.
International Search Report and Written Opinion for International (PCT) Patent Application No. PCT/IB2016/000654, dated Aug. 8, 2016 13 pages.
Second Written Opinion for International (PCT) Patent Application No. PCT/IB2016/000654, dated Jun. 7, 2017 8 pages.
International Preliminary Report on Patentability for International (PCT) Patent Application No. PCT/IB2016/000654, dated Sep. 4, 2017 22 pages.
International Search Report and Written Opinion for International (PCT) Patent Application No. PCT/EP2016/059748, dated Jun. 24, 2016 13 pages.
Second Written Opinion for International (PCT) Patent Application No. PCT/EP2016/059748, dated Mar. 30, 2017 8 pages.
International Preliminary Report on Patentability for International (PCT) Patent Application No. PCT/EP2016/059748, dated Jun. 29, 2017 19 pages.
International Search Report and Written Opinion for International (PCT) Patent Application No. PCT/EP2016/059750, dated Aug. 2, 2016 12 pages.
International Search Report and Written Opinion for International (PCT) Patent Application No. PCT/IB2016/000653, dated Sep. 2, 2016 12 pages.
Second Written Opinion for International (PCT) Patent Application No. PCT/IB2016/000653, dated Apr. 28, 2017 6 pages.
International Preliminary Report on Patentability for International (PCT) Patent Application No. PCT/IB2016/000653, dated Jul. 27, 2017 7 pages.
International Search Report and Written Opinion for International (PCT) Patent Application No. PCT/EP2016/059753, dated Jun. 3, 2016 11 pages.
Second Written Opinion for International (PCT) Patent Application No. PCT/EP2016/059753, dated Mar. 31, 2017 6 pages.
International Preliminary Report on Patentability for International (PCT) Patent Application No. PCT/EP2016/059753, dated Jul. 3, 2017 18 pages.
International Search Report and Written Opinion for International (PCT) Patent Application No. PCT/EP2016/059752, dated Jul. 26, 2016 12 pages.
Second Written Opinion for International (PCT) Patent Application No. PCT/EP2016/059752, dated Mar. 29, 2017 6 pages.
International Preliminary Report on Patentability for International (PCT) Patent Application No. PCT/EP2016/059752, dated Jun. 28, 2017 17 pages.
International Search Report and Written Opinion for International (PCT) Patent Application No. PCT/EP2016/059754, dated Jun. 8, 2016 12 pages.
Second Written Opinion for International (PCT) Patent Application No. PCT/EP2016/059754, dated Mar. 21, 2017 5 pages.
International Preliminary Report on Patentability for International (PCT) Patent Application No. PCT/EP2016/059754, dated Jun. 19, 2017 19 pages.
International Search Report and Written Opinion for International (PCT) Patent Application No. PCT/EP2016/059756, dated Jun. 27, 2016 11 pages.
Second Written Opinion for International (PCT) Patent Application No. PCT/EP2016/059756, dated Mar. 31, 2017 6 pages.
International Preliminary Report on Patentability for International (PCT) Patent Application No. PCT/EP2016/059756, dated Jul. 3, 2017 17 pages.
International Preliminary Report on Patentability for International (PCT) Patent Application No. PCT/EP2016/059750, dated Nov. 16, 2017 8 pages.
Official Action for U.S. Appl. No. 15/569,218, dated Nov. 16, 2018 14 pages.
Notice of Allowance for U.S. Appl. No. 15/569,218, dated May 15, 2019 9 pages.
Official Action for U.S. Appl. No. 15/569,196, dated Mar. 22, 2019 17 pages.

\* cited by examiner

INVISIBLE INDICATION OF DURESS VIA WEARABLE

CROSS REFERENCE TO RELATED APPLICATIONS

The present application is a national stage application under 35 U.S.C. 371 of PCT Patent Application No. PCT/IB2016/000669, having an international filing date of May 2, 2016 which designated the United States, which claimed the benefits of and priority, under 35 U.S.C. § 119(e), to U.S. Provisional Application Ser. Nos. 62/156,035, filed on May 1, 2015, entitled "Authentication Channel Flow through Wearable"; 62/156,030, filed on May 1, 2015, entitled "Using Multiple Mobile Devices to Determine Position, Location, or Inside/Outside Door"; 62/161,640, filed on May 14, 2015, entitled "Using Wearable to Determine Ingress or Egress"; 62/162,273, filed on May 15, 2015, entitled "Continuous Authentication"; 62/164,099, filed on May 20, 2015, entitled "Using a Secondary Mobile Device to Identify a Trusted Environment"; 62/167,172, filed on May 27, 2015, entitled "Method and Apparatus for Making a Decision on a Card"; 62/167,136, filed on May 27, 2015, entitled "Split Provisioning of Personal Wearable and Enterprise Phone"; 62/197,945, filed on Jul. 28, 2015, entitled "Wearable Discovery for Authentication"; 62/197,985, filed on Jul. 28, 2015, entitled "Wearable Misplacement"; and 62/198,240, filed on Jul. 29, 2015, entitled "Invisible Indication of Duress via Wearable." The entire disclosures of the applications listed above are hereby incorporated by reference, in their entirety, for all that they teach and for all purposes.

FIELD

The present disclosure is generally directed to access control systems and more specifically to devices that are configured to provide access information for access control systems.

BACKGROUND

In general, access control systems rely upon lock and key principles to grant or deny access to a secure asset. Whether the keys are configured as physical keys presented to a mechanical lock or virtual keys presented to an access control unit, most keys include specific features or characteristics that are either recognized by or match lock features before access is granted to the asset. Some access control systems employ the use of various portable devices to maintain credential information for presentation to a reading device. The portable devices are generally configured to communicate with the reading device via wireless communication protocols.

One example of a portable device includes the radio frequency identification (RFID) device, such as a contactless smart card, key fob, or the like, to store credential information that can be used to gain access to an asset. When presented to a reader/interrogator, the smart card transmits the stored credential information for verification by the reader/interrogator. The reader/interrogator processes the credential information and determines if the smart card being presented is a valid smart card. If the reader/interrogator determines that credential information associated with the smart card is valid, then the reader/interrogator initiates any number of actions including allowing the holder of the smart card access to an asset protected thereby.

Another example of a portable device can include a wireless mobile device, such as a communication device, mobile phone, smartphone, etc. In this case, credential information may be stored in a memory associated with the mobile device and communicated to a reading device using at least one wireless communication protocol available to the mobile phone.

SUMMARY

In some cases, a user may provide a duress code at an access control interface of an access control system. By way of example, the duress code may be entered as a particular access code, or sequence of numbers, at an access control keypad. The duress code may be used to indicate to a third party that a user is attempting to gain access to the asset while under duress. The duress code may be configured to sound an alarm or notify a monitoring party that an unauthorized access attempt is being made. Upon receiving the duress code notification, the monitoring party may initiate emergency response protocols, dispatch police, or alert other parties.

A number of issues exist associated with duress codes provided via typical access control interfaces. For example, a user may be required to remember multiple codes for a particular access system, namely, an authentic access code and an emergency/duress code. Some access control systems utilize duress codes that employ a sequence of transposed digits from a user's authentic access code. Among other things, these types of duress codes can be easy to misenter on a keypad, especially during routine access operations. Other access control systems utilize a set of standard duress codes which are common between users of the system. At least one problem with standard duress codes is that they are known in the community, especially by those who may attempt to thwart an access control system. As such, it may be easy to detect when a user is entering a standard duress code by observing the user entering the code via an access control interface. Furthermore, entering duress codes typically occurs at particular access control interfaces (e.g., those interfaces having a keypad, etc.) and not at other access control readers throughout a location or facility (e.g., card readers, etc.). In this example, if an individual thwarts the first access control interface having the ability to receive duress codes, or if the individual is already inside an area having the first access control device, then the individual may be free to access other areas of a system. In some cases, the individual inside this area may coerce users to gain access to an asset that the individual is not authorized to access and the users may not be able to provide a duress code alerting others of the unauthorized access.

It is with respect to the above issues and other problems that the embodiments presented herein were contemplated. In general, embodiments of the present disclosure provide methods, devices, and systems for providing an invisible duress signal based on at least one input received at a wearable device. More specifically, the invisible duress signal may be generated in response to detecting one or more of biometric information (e.g., breathing rate, breathing intensity, heart rate, blood pressure, temperature, heat signature, etc., combinations thereof) associated with a user, audio input from the user, audio input from an environment surrounding the user, accelerometer and/or gyroscopic data associated with one or more wearables worn or associated with the user, and the like. The duress signal may be sent from the wearable device as a wireless communication to at least one of a communication device, an access control device (e.g., reader, interrogator, checkpoint, etc.), another wearable device (e.g., associated with another user, etc.), a server, etc. Communication of the duress signal may be based on a proximity of a receiving device to the wearable. In some embodiments, the wireless communication may be relayed from the at least one communication device, wearable device, access control device, server, etc. to one or more other devices that are internal and/or external to an access control system.

In some embodiments, the wearable device may be configured to measure a heart rate of a user (e.g., a heightened heart rate, etc.) and provide the measured heart rate to a reader. In some cases, the heightened heart rate alone may be enough to trigger a duress signal.

In one embodiment, a duress alert may be provided to a wearable device (e.g., a predetermined wearable, etc.) that may be within a predetermined distance of a reader or reading device. Additionally or alternatively, a type of alert provided may be changed depending upon where the wearable device is located in a location. For example, the wearable may include a Bluetooth®, or other wireless protocol, headset (e.g., Google Glass®, etc.). In this case, the duress signal, and/or any other alert, may be provided to the wearable such that the wearer (e.g., a user, etc.) receives the alert but no one else receives the alert, even if other people are in the same room as the wearer of the wearable. Among other things, this alert presentation approach can enable the silent and efficient distribution of alerts, especially among one or more users.

A wearable device can include any physical electronic device having a processor, a memory, and a communications module that is configured to be worn by, or otherwise attached to, a user. In some cases, the wearable device may be worn as an implant introduced intradermally (e.g., within the skin, etc.) and/or subdermally (e.g., under the skin, etc.) in a user. Additionally or alternatively, a wearable device may be adhered or otherwise placed into contact with the dermis of a user (e.g., supradermally or outside of the skin of a user, etc.). In some embodiments, a wearable device may be worn as an article of clothing or other accessory. Examples of wearable devices can include, but are in no way limited to, activity monitors, heart rate monitors, watches, rings, belts, bracelets, jewelry, clothing, buttons, necklaces, shoes, hats, pins, accessories, scarves, combinations and/or parts thereof, and/or any other wearable item.

In some embodiments, the wearable device and/or a mobile communications device associated with the user may be configured to communicate (e.g., duress signals, etc.) with one or more reading devices in a communication range via any number of communications protocols associated with the wearable and/or the mobile device. The communication range may be based on any number of communications protocols associated with the wearable and/or the mobile device. Examples of communications protocols can include, but are in no way limited to, the protocol or protocols associated with near field communication (NFC), radio frequency identification (RFID)(e.g., operating at 125 kHz, 13.56 kHz, etc.), Bluetooth® wireless communication, Bluetooth® Low Energy (BLE), Personal Area Network (PAN), Body Area Network (BAN), cellular communications, WiFi communications, and/or other wireless communications.

As provided herein, the wearable device may be configured to operate in conjunction with one or more mobile devices. In some embodiments, the mobile devices may be provided by a manufacturer different from the wearable device.

The wearable device may include its own power source or use power provided from another source. In some embodiments, the wearable device may include electronics that can be powered (e.g., inductively, capacitively, wirelessly, via a wired connection, or some other mechanism) by a mobile device and/or a reading device. One example of such electronics that may be incorporated into a wearable device includes RFID components, (e.g., a capacitor, antenna, etc.). In this example, when the wearable device is presented within an RFID field provided by the mobile device and/or the reading device, the mobile device and/or the reading device provides energy via the RFID field that can be stored in the capacitor of the wearable device.

In some embodiments, the wearable may be configured to receive information from one or more sensors (e.g., wearable sensors, mobile device sensors, other device sensors, etc.). The information may correspond to biometric information, physical input, environmental information, combinations thereof, and the like. This information may be analyzed by the wearable, a mobile device, a communication device, or some other device, for duress information. In one embodiment, the information may be compared to baseline measurements (e.g., for a particular user, type of user, etc.), threshold values, and/or duress criterion. In any event, the analysis may include determining whether the measured information received from the sensors corresponds to at least one duress condition stored in a memory. The duress condition may be based on thresholds, rules, individual profiles, generic profiles (e.g., developed to characterize an individual and/or the duress condition), recorded responses to predetermined duress stimuli, combinations thereof, etc.

In the event that the information received from the one or more sensors matches a duress condition, the wearable and/or the mobile communication device associated with a user may send a duress signal to at least one device associated with an access control system. In some embodiments, the duress signal may be sent to one or more devices (e.g., wearable devices, mobile communication devices, reading devices, duress alert devices, etc., that are within a communication range of or geographical proximity to the wearable and/or the mobile communication device associated with a user. Upon receiving a duress signal, the receiving device may provide and/or present an alert via one or more output devices (e.g., lights, displays, speakers, tactile feedback mechanisms, vibrating device, etc.). The alert may be configured to indicate a type of duress condition, a location of the duress condition, provide a warning and/or other information about the duress condition to a user.

For example, a user may be seized by an intruder at a particular location in an access control system in an attempt to steal (e.g., access, assets, property, etc.) and/or inflict harm. Upon being seized, the wearable of the user may interpret at least one of the user's heart rate, biometric information, movement information, etc., and determine that the user has been subjected to some type of duress (e.g., exceeding baseline thresholds, based on rules, etc.). In response, the wearable and/or some other device associated with the user (and in communication with the wearable) may send a duress signal that is configured to indicate the duress condition of the user. A wearable being worn by another user in the access control system may receive the duress signal and present information regarding the duress condition to the other user. For instance, a notification may be provided to a user's communication device that a person has been seized at a particular location. Additionally or alternatively, the notification may identify the user, a location of the user, and/or a relative position of the user relative to the other user, etc.

In some embodiments, the duress signal may be received by a reading device of the access control system. Based on the type of duress signal received (e.g., threat, health event, combination threat and health event, fire, etc.) the access control system may determine to activate or deactivate equipment, initiate alarms, restrict access, provide unrestricted access to a safe area (e.g., unlock a combination of one or more doors in an escape route, illuminate or otherwise highlight an unrestricted path to safety though the locked system, etc.), provide unrestricted access to the location or site of the duress condition. Additionally or alternatively, the access control system may send duress signal alerts to one or more users in the access control system. The alerts may be configured to be viewed and/or detected by a specific user through a private output mechanism (e.g., presented to a private display, for example in a user's eyewear, presented to a private speaker, such as a user's headphones, hearing aid, or headphones, and/or a vibratory mechanism on a user's phone, etc.) such that other users in proximity to the specific user cannot detect the alert. Alternatively, the alerts may be configured to be broadcast to one or more public output mechanisms (e.g., a loud speaker, television, monitor, alarm system, siren, etc.) to alert multiple users simultaneously. As can be appreciated, when a duress condition warrants a discrete response the private alert system may be employed.

The term "computer-readable medium," as used herein, refers to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credential information" is any data, set of data, encryption scheme, key, and/or transmission protocol used by a particular device (e.g., a "credential device") to authenticate and/or verify its authenticity with a reader, mobile device, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
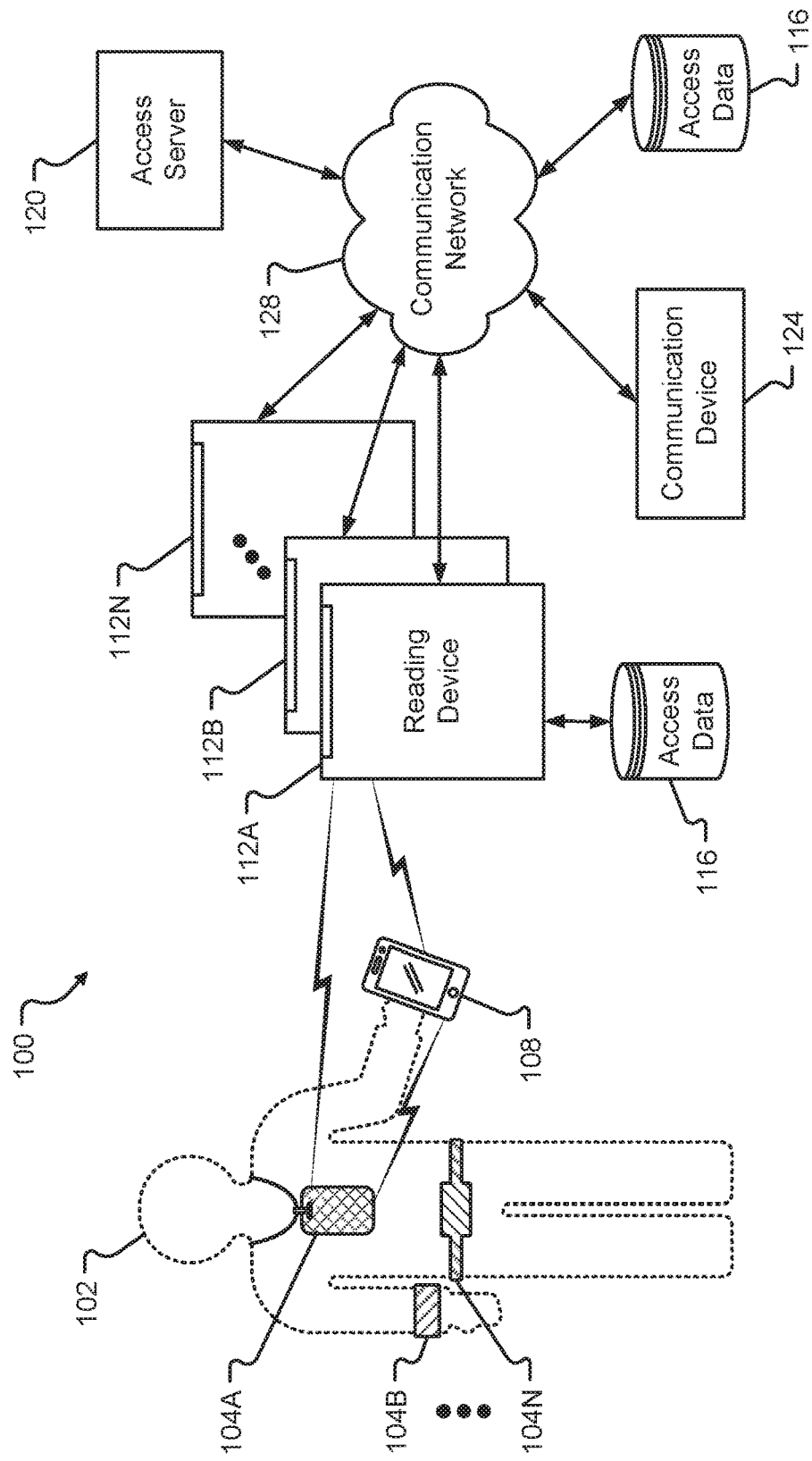
FIG. 1 is a diagram depicting an access control system in accordance with embodiments of the present disclosure.

FIG. 1 is a diagram depicting an access control system 100 for authenticating a user 102 via wearable devices 104 in accordance with embodiments of the present disclosure. In one embodiment, the access control system 100 comprises at least one reading device 112, at least one wearable device 104, and at least one portable device 108. The reading device 112 may include an access data memory 116. The access data memory 116 may be configured to store access information, identification data, rules, program instructions, and/or other data associated with performing access operations of an access control system 100. In some embodiments, the reading device 112 may be configured to communicate with an access data memory 116 across a communication network 128. The access data memory 116 may be located remotely, locally, and/or locally and remotely, from the reading device 112.

The wearable device 104 and/or the mobile device 108 may be configured to communicate with a reading device 112 across one or more wireless communication connections. These one or more wireless communication connections can include communications via at least one of conventional radio protocols, proximity-based wireless communication protocols, Bluetooth™, BLE, infrared, audible, NFC, RF, and other wireless communication networks and/or protocols. In some cases, communications between the wearable device 104 and the reading device 112 may be established automatically when the wearable device 104 enters an active zone of an interrogating reading device 112. In one embodiment, the active zone of the reading device 112 may be defined as a three-dimensional space where the intensity of RF signals emitted by the reading device 112 exceeds a threshold of sensitivity of the wearable device 104 and the intensity of RF signals emitted by the wearable device 108 exceeds a threshold of sensitivity of the reading device 112.

In some embodiments, the wearable device 104 and/or the mobile device 108 may be configured to communicate with a reading device 112 across a communication network 128. The communication network 128 can include communication via at least one of conventional radio networks, wireless communication networks, Zig-Bee, GSM, CDMA, WiFi, and/or using other communication networks and/or protocols as provided herein.

In one embodiment, authentication may be required between the wearable device 104 and the reading device 112 before further communications are enabled. Additionally or alternatively, authentication may be required between the wearable device 104 and the mobile device 108 before further communications are enabled. In any event, the further communications may provide communications in which access control information (e.g., keys, codes, credentials, etc.) are shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request access control information from the wearable device 104 and/or the mobile device 108. This information may be used to validate the wearable device 104. Validation may include referring to information stored in access data memory 120 or some other memory associated with the wearable device 104 and/or the mobile device 108. Typically, a reading device 112 is associated with a particular asset (e.g., a door protecting access to a secure room, a computer lock protecting sensitive information or computer files, a lock on a safe, and the like). In one embodiment, a user 102 may be validated based on biometric information received by the wearable device 104. For example, a user 102 under duress may provide biometric information (e.g., heightened heart rate, sweating, heavy breathing, etc.) that correlates to a duress condition. In this instance, the reading device 112 may prevent access, grant access, grant limited access, and/or initiate a duress alert based on the biometric information from the wearable device 104. In some embodiments, a user 102 must be in a particular state that is not in duress (e.g., a non-duress state, etc.) and must have keys, credentials, or other access information stored on the wearable device 104 and/or the mobile device 108 in order to be validated via one or more components of the access control system 100. During this process, the reading device 112 may generate signals facilitating execution of the results of interrogating the wearable and/or mobile device 104, 108 (e.g., engages/disengages a locking mechanism, allows/disallows movement of a monitored article, temporarily disables itself, activates an alarm system, provides access to a computer system, provides access to a particular document, and the like). Alternatively, the access server 120 may generate such signals In accordance with embodiments of the present disclosure, the reading device 112 may collect access control information associated with the wearable device 104 before an access control decision can be made. For example, the reading device 112 may require credential information stored on the wearable device 104 to validate the wearable device 104. The validity of the wearable device 104 may be based on the validity of an associated mobile device 108, or vice versa. In one embodiment, upon validating credential information stored on the wearable device 104, the reading device 112 generates signals facilitating execution of the results of interrogating the wearable device 104 and/or the mobile device 108 (e.g., engages/disengages a locking mechanism, allows/disallows movement of a monitored article, temporarily disables itself, activates an alarm system, provides access to a computer system, provides access to a particular document, and the like). As provided above, the access server 120 may generate such signals.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 116. Like the memory of the access server 120, the access data memory 116 may comprise a solid state memory or devices. The access data memory 116 may comprise a hard disk drive or other random access memory.

In some embodiments, the reading device 112 may be configured to communicate with one or more devices across a communication network 128. For example, the reading device 112 may communicate with a wearable device 104 and/or a mobile device 108 across the communication network 128. Among other things, this communication can allow for back-end authentication and/or provide notifications from the reading device 112 to the mobile device 108. In some embodiments, the reading device 112 may be configured to provide duress alerts to one or more devices across the communication network 128 based on duress signals received from one or more wearable devices 104 and/or mobile devices 108. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include at least one communication device 124. A communication device 124 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 124 may be used to receive communications sent from the wearable device 104 via the reading device 112.

Figure 2:
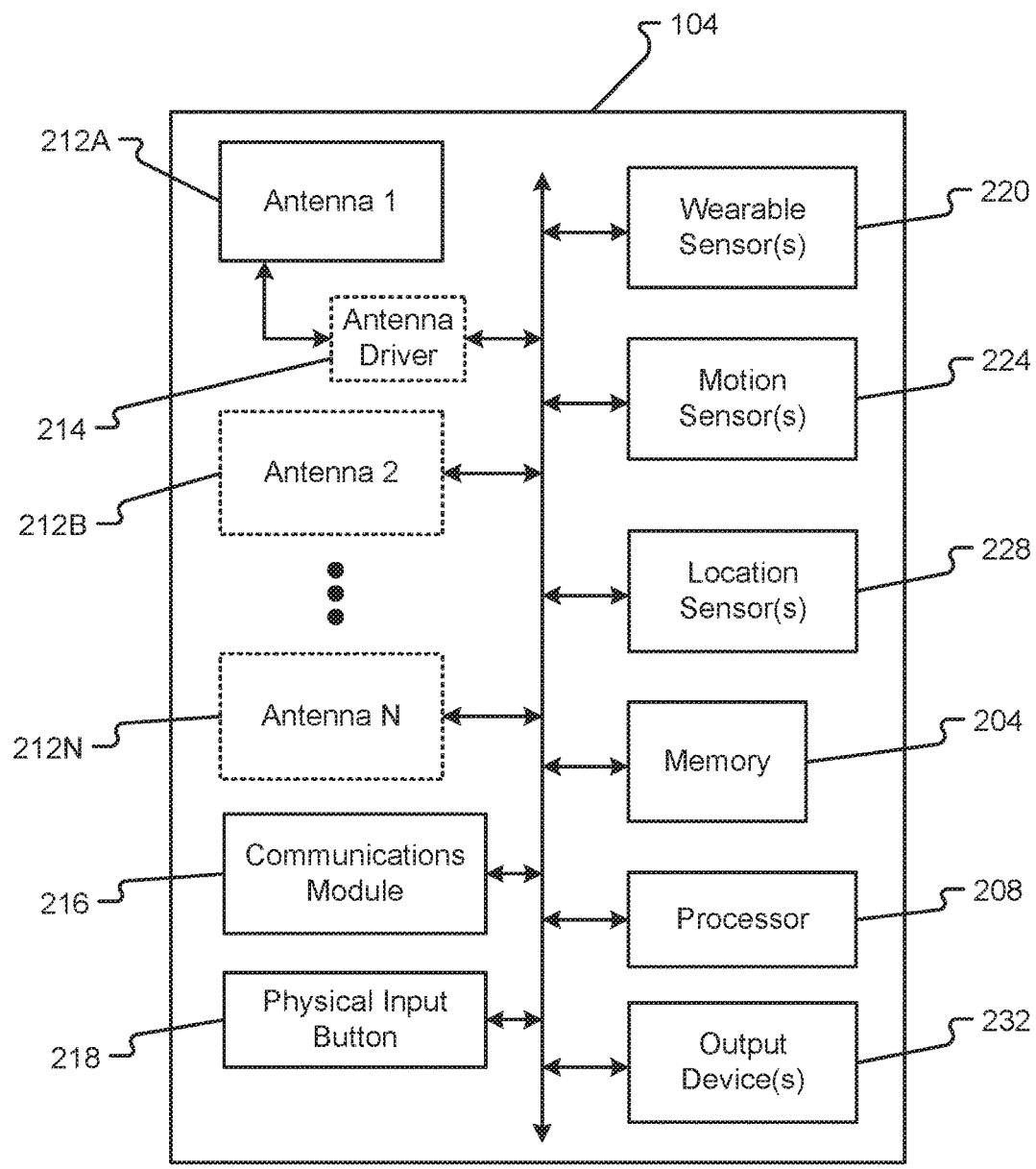
FIG. 2 is a block diagram depicting a wearable device or components thereof in accordance with embodiments of the present disclosure.

Referring now to FIG. 2, a block diagram depicting a wearable device 104 is shown in accordance with embodiments of the present disclosure. The wearable device 104 may include one or more components, such as, a memory 204, a processor 208, an antenna 212A-N, a communications module 216, at least one physical input button 218, a wearable sensor 220, a motion sensor 224, a location sensor 228, and at least one output device 232. In some embodiments, the wearable device 104 may further include a power module. The processor 208 may be an application specific integrated circuit (ASIC), microprocessor, programmable controller, or the like.

The memory 204 of the wearable device 104 may be used in connection with the execution of application programming or instructions by the processor 208, and for the temporary or long term storage of program instructions and/or data. The memory 204 may contain executable functions that are used by the processor 208 to run other components of the wearable device 104. In one embodiment, the memory 204 may be configured to store credential information. For instance, the credential information may include, but is not limited to, unique identifications, manufacturer identification, passwords, keys, encryption schemes, transmission protocols, and the like. In some embodiments, the memory 204 may be configured to store measured biometric information, baseline biometric information (e.g., associated with a user 102, etc.), sensor data (e.g., location data, force data, and other information, etc.), rules, duress condition thresholds, duress condition types, and/or the like. As examples, the memory 204 may comprise RAM, DRAM, SDRAM, or other solid state memory.

The one or more antennas 212A-N may be configured to enable wireless communications between the wearable device 104 and a reading device 112 and/or mobile device 108. As can be appreciated, the antenna(s) 212A-N may be arranged to operate using one or more wireless communication protocols and operating frequencies including, but not limited to, Bluetooth®, NFC, Zig-Bee, GSM, CDMA, WiFi, RF, and the like. By way of example, the antenna(s) 212A-N may be RF antenna(s), and as such, may transmit RF signals through free-space to be received by a reading device 112 having an RF transceiver.

In some embodiments, the wearable device 104 may include a power module. The power module may be configured to provide power to the parts of the wearable device 104 in order to operate. The power module may store power in a capacitor of the power module. In one embodiment, electronics in the power module may store energy in the capacitor and turn off when an RF field is present. This arrangement can ensure that energy is presented to the wearable device 104 minimizing any effect on read distance. Although the wearable device 104 may be configured to receive power passively from an electrical field of a reading device 112, it should be appreciated that the wearable device 104 may provide its own power. For example, the power module may include a battery or other power source to supply power to parts of the wearable device 104.

The wearable device 104 may include a communications module 216 that is configured to communicate with one or more different systems or devices either remotely or locally to the wearable device 104. Thus, the communications module 216 can send or receive messages from other wearable devices 104, from mobile devices 108, from reading devices 112, from communication devices 124, from access servers 120, from access control systems, or from other systems. In some embodiments, the communicated information may be provided to, or exchanged with, other components within the wearable device 104.

In one embodiment, the wearable device 104 may include at least one physical input button 218. The physical input button 218 may be actuated, pressed, or otherwise configured to receive input provided by a user 102. For instance, a user 102 may communicate, verify, confirm, or otherwise interact with questions, directions, polling, or other communications sent to the user 102 via the wearable device 104. By way of example, a user 102 may have a heightened heart rate due to exercise or increased activity that is unrelated to duress. Although this biometric information may correspond to duress in a typical situation, the user 102 may utilize the physical input button 218 to confirm or deny an inquiry sent to the wearable device 104 (e.g., via a vibration, illumination, display, audible output, visual output, tactile output, etc.) as to whether the user 102 is actually under duress. In some embodiments, the user 102 may be required to actuate the button 218 in addition to having the requisite biometric information (e.g., a heightened heart rate, etc.) to provide a duress signal.

Embodiments of the wearable device 104 may include at least one wearable sensor 220. Among other things, the wearable sensor 220 may be configured to detect an attachment and/or detachment of the wearable to a user 102. For instance, a wearable device 104 may include a clasp that is required to be opened in attaching and/or removing the wearable from a user 102 (e.g., similar to a clasp of a watch band, bracelet, earring, necklace, etc.). The actuation of the clasp may be detected by a wearable sensor 220 of the wearable device 104. Examples of other wearable sensors 220 may include, but are in no way limited to, contact sensors, switches, proximity sensors, etc., and/or combinations thereof.

In some embodiments, the wearable device 104 may employ one or more sensors 220, 224, 228 that are configured to detect information corresponding to a state of the wearable device 104. The wearable sensors 220 may include, but are not limited to, one or more biometric sensors (e.g., heart rate, body temperature and/or heat signature, blood pressure, etc.), capacitive sensors, light sensors, temperature sensors, pressure sensors, contact sensors, combinations thereof, and the like. It is an aspect of the present disclosure that the processor 208 of the wearable device 104 may receive the sensor information and determine whether the wearable device 104 is being worn by a user 102, whether the wearable device 104 has been removed from a user 102, whether any interruption to the wearing of the wearable device 104 is detected (e.g., whether the wearable device 104 has been continuously worn by, and/or removed from, a user 102, timing associated therewith, etc.). By way of example, the biometric sensor of the wearable sensors 220 may detect biometric characteristics associated with a user 102 wearing the wearable device 104 (e.g., a heart rate, a blood pressure, a body temperature, skin contact data, etc.). The biometric characteristics may be used to determine a state of the wearable device 104 (e.g., being worn or not, etc.), determine an identity of a user 102 wearing the wearable device 104, and/or determine whether the user 102 is under duress or is in a duress condition (e.g., via comparing collected biometric characteristics to baseline characteristics stored in a memory and associated with the user 102, etc.). In some embodiments, the biometric information may be used alone, or in combination with other sensor information, to determine whether the user 102 is under duress or in a duress condition.

The motion sensors 224 may include one or more of a gyroscope, accelerometer, transducer, and/or other mechanical detection component that are each configured to detect a force and/or motion associated with the wearable device 104. This detected motion of the wearable device 104 may be compared, via the processor 208 of the wearable device 104, to known motion profiles stored in the memory 204 or other associated memory in determining a state of the wearable device 104. For instance, a particular motion of the wearable device 104 may indicate that the wearable device 104 is being worn by a user 102. In one embodiment, the detected motion of a wearable device 104 may be compared to the detected motion of an associated mobile device 108, or vice versa, to generate comparison results. The association of the mobile device 108 may be between the wearable device 104 and/or between a user 102 having the wearable device 104. In any event, the comparison results may indicate similarities between the motion of the wearable device 104 and a motion of the mobile device 108 over time. Among other things, the motion sensors 224 may be employed to measure impact force, sudden movements, sudden changes of direction, etc. This motion information may indicate that a user 102 is being abused, assaulted, coerced, or otherwise moved against the will of the user 102. In some embodiments, the motion information may be used alone, or in combination with other sensor information, to determine whether the user 102 is under duress or in a duress condition. It is an aspect of the present disclosure that temporal information surrounding the impact and other received duress information and/or biometrics may serve to indicate a type of duress condition. For instance, when a user 102 experiences a force of impact and then an increase in heartrate, a determination may be made that the duress condition is associated with an attack, assault, or other physical impact. Additionally or alternatively, when a user 102 experiences a force of impact after an increase or abnormality in heartrate, the determination may be made that the duress condition is associated with a health event for the user 102. As another example, when a user 102 experiences decrease in heartrate preceding a force of impact, a determination may be made that the duress condition is associated with health event, and even a specific type of health event, for the user 102.

The wearable device 104 may include one or more location sensors 228. The location sensors may be configured to determine a geographical location and/or position of the wearable device 104. In one embodiment, this location may be based on Global Positioning System (GPS) data provided by a GPS module of the wearable device 104. In some embodiments, the location of the wearable device 104 may be provided based on cell tower data, WiFi information, iBeacon information, and/or some other location information provided by a location module and/or a communications module 216 of the wearable device 104. The location of a mobile device 108 may be determined in a similar, if not identical, manner as determining the location of the wearable device 104. In some embodiments, the authentication of a user 102 may be based on determining a location of the wearable device 104 and/or a location of the mobile device 108. Similar, if not identical, to the other data collected by the components of the wearable device 104, the location data may be stored in the memory 204 and/or communicated to another device via the communications module 216 and other components (e.g., as part of a duress signal, etc.).

Figure 3:
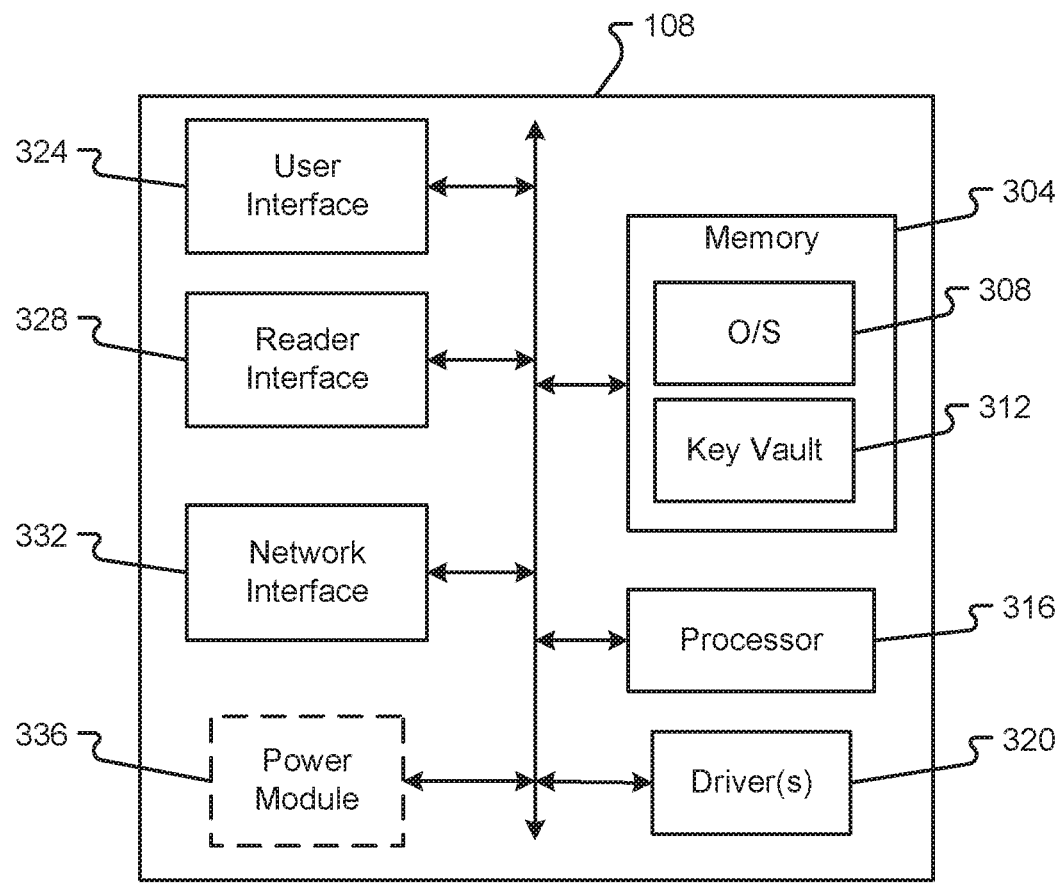
FIG. 3 is a block diagram depicting a mobile device or components thereof in accordance with embodiments of the present disclosure

FIG. 3 shows a block diagram depicting a mobile device 108 in accordance with embodiments of the present disclosure. The mobile device 108 may correspond to any type of electronic device and, as the name suggests, the electronic device may be portable in nature. As some examples, the mobile device 108 may correspond to a cellular phone or smartphone carried by a user. Other examples of a mobile device 108 include, without limitation, wearable devices (e.g., glasses, watches, shoes, clothes, jewelry, wristbands, stickers, etc.). The mobile device 108, as shown in FIGS. 1 and 3, may be provided with a key vault 312 that stores one or a plurality of keys. The key(s) may be communicated to a reader 112 in connection with a holder of the mobile device 108 attempting to gain access to an asset protected by the reader 112. As an example, the mobile device 108 may be presented to the reader 112 by a user 102 or holder of the mobile device 108.

If NFC is being used for the communication channel, then the reader 112 and mobile device 108 may have their interfaces/antennas inductively coupled to one another at which point the reader and/or mobile device 108 will authenticate or mutually authenticate with one another. Following authentication, the reader 112 may request a key or multiple keys from the mobile device 108, or the mobile device 108 may offer a key or multiple keys to the reader 112. Upon receiving the key(s) from the mobile device 108, the reader 112 may analyze the key(s) and determine if the key(s) are valid and, if so, allow the holder/user of the mobile device 108 access to the asset protected by the reader 112. It should be appreciated that the mobile device 108 may alternatively or additionally be configured to analyze information received from the reader 112 in connection with making an access control decision and/or in connection with making a decision whether or not to provide key(s) to the reader 112. Examples of technologies that can be used by the mobile device 108 to make an access control decision for itself are further described in U.S. Pat. No. 8,074,271 to Davis et al. and U.S. Pat. No. 7,706,778 to Lowe, both of which are hereby incorporated herein by reference in their entirety.

If BLE or some other non-inductive protocol (e.g., Wi-Fi) is being used for the communication channel, then the reader 112 and mobile device 108 may perform a discovery routine prior to pairing with one another or otherwise connecting to establish the communication channel. After the channel is established, however, the reader 112 and mobile device 108 may then authenticate one another and exchange relevant information, such as the key(s), to enable an access control decision to be made. If a positive access control decision is made (e.g., it is determined that the key(s) are valid and the mobile device 108 is allowed to access the asset protected by the reader 112), then the reader 112 may initiate one or more actions to enable the holder/user 102 of the mobile device 108 to access the asset protected by the reader 112.

The mobile device 108 is shown to include computer memory 304 that stores one or more Operating Systems (O/S) 308 and a key vault 312, among other items. The mobile device 108 is also shown to include a processor 316, one or more drivers 320, a user interface 324, a reader interface 328, a network interface 332, and a power module 336. Suitable examples of a mobile device 108 include, without limitation, smart phones, PDAs, laptops, PCs, tablets, netbooks, wearable devices, and the like.

The memory 304 may correspond to any type of non-transitory computer-readable medium. In some embodiments, the memory 304 may comprise volatile or non-volatile memory and a controller for the same. Non-limiting examples of memory 304 that may be utilized in the mobile device 108 include RAM, ROM, buffer memory, flash memory, solid-state memory, or variants thereof.

The O/S 308 may correspond to one or multiple operating systems. The nature of the O/S 308 may depend upon the hardware of the mobile device 108 and the form factor of the mobile device 108. The O/S 308 may be viewed as an application stored in memory 304 that is processor-executable. The O/S 308 is a particular type of general-purpose application that enables other applications stored in memory 304 (e.g., a browser, an email application, an SMS application, etc.) to leverage the various hardware components and driver(s) 320 of the mobile device 108. In some embodiments, the O/S 308 may comprise one or more APIs that facilitate an application's interaction with certain hardware components of the mobile device 108. Furthermore, the O/S 308 may provide a mechanism for viewing and accessing the various applications stored in memory 304 and other data stored in memory 304.

The processor 316 may correspond to one or many microprocessors that are contained within the housing of the mobile device 108 with the memory 304. In some embodiments, the processor 316 incorporates the functions of the user device's Central Processing Unit (CPU) on a single Integrated Circuit (IC) or a few IC chips. The processor 316 may be a multipurpose, programmable device that accepts digital data as input, processes the digital data according to instructions stored in its internal memory, and provides results as output. The processor 316 implement sequential digital logic as it has internal memory. As with most known microprocessors, the processor 316 may operate on numbers and symbols represented in the binary numeral system.

The driver(s) 320 may correspond to hardware, software, and/or controllers that provide specific instructions to hardware components of the mobile device 108, thereby facilitating their operation. For instance, the user interface 324, reader interface 328, and network interface 332, may each have a dedicated driver 320 that provides appropriate control signals to effect their operation. The driver(s) 320 may also comprise the software or logic circuits that ensure the various hardware components are controlled appropriately and in accordance with desired protocols. For instance, the driver 320 of the reader interface 328 may be adapted to ensure that the reader interface 328 follows the appropriate proximity-based protocols (e.g., BLE, NFC, Infrared, Ultrasonic, IEEE 802.11N, etc.) such that the reader interface 328 can exchange communications with the credential. Likewise, the driver 320 of the network interface 332 may be adapted to ensure that the network interface 332 follows the appropriate network communication protocols (e.g., TCP/IP (at one or more layers in the OSI model), UDP, RTP, GSM, LTE, Wi-Fi, etc.) such that the network interface 332 can exchange communications via the communication network 128. As can be appreciated, the driver(s) 320 may also be configured to control wired hardware components (e.g., a USB driver, an Ethernet driver, etc.).

As mentioned above, the user interface 324 may comprise one or more user input devices and/or one or more user output devices. Examples of suitable user input devices that may be included in the user interface 324 include, without limitation, buttons, keyboards, mouse, touch-sensitive surfaces, pen, camera, microphone, etc. Examples of suitable user output devices that may be included in the user interface 324 include, without limitation, display screens, touchscreens, lights, speakers, etc. It should be appreciated that the user interface 324 may also include a combined user input and user output device, such as a touch-sensitive display or the like.

The reader interface 328 may correspond to the hardware that facilitates communications with the credential for the mobile device 108. The reader interface 328 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 328 is specifically provided to facilitate proximity-based communications with a credential via communication channel or multiple communication channels.

The network interface 332 may comprise hardware that facilitates communications with other communication devices over the communication network 128. As mentioned above, the network interface 332 may include an Ethernet port, a Wi-Fi card, a Network Interface Card (NIC), a cellular interface (e.g., antenna, filters, and associated circuitry), or the like. The network interface 332 may be configured to facilitate a connection between the mobile device 108 and the communication network 128 and may further be configured to encode and decode communications (e.g., packets) according to a protocol utilized by the communication network 128.

The power module 336 may include a built-in power supply (e.g., battery) and/or a power converter that facilitates the conversion of externally-supplied AC power into DC power that is used to power the various components of the mobile device 108. In some embodiments, the power module 336 may also include some implementation of surge protection circuitry to protect the components of the mobile device 108 from power surges.

Figures 4A, 4B:
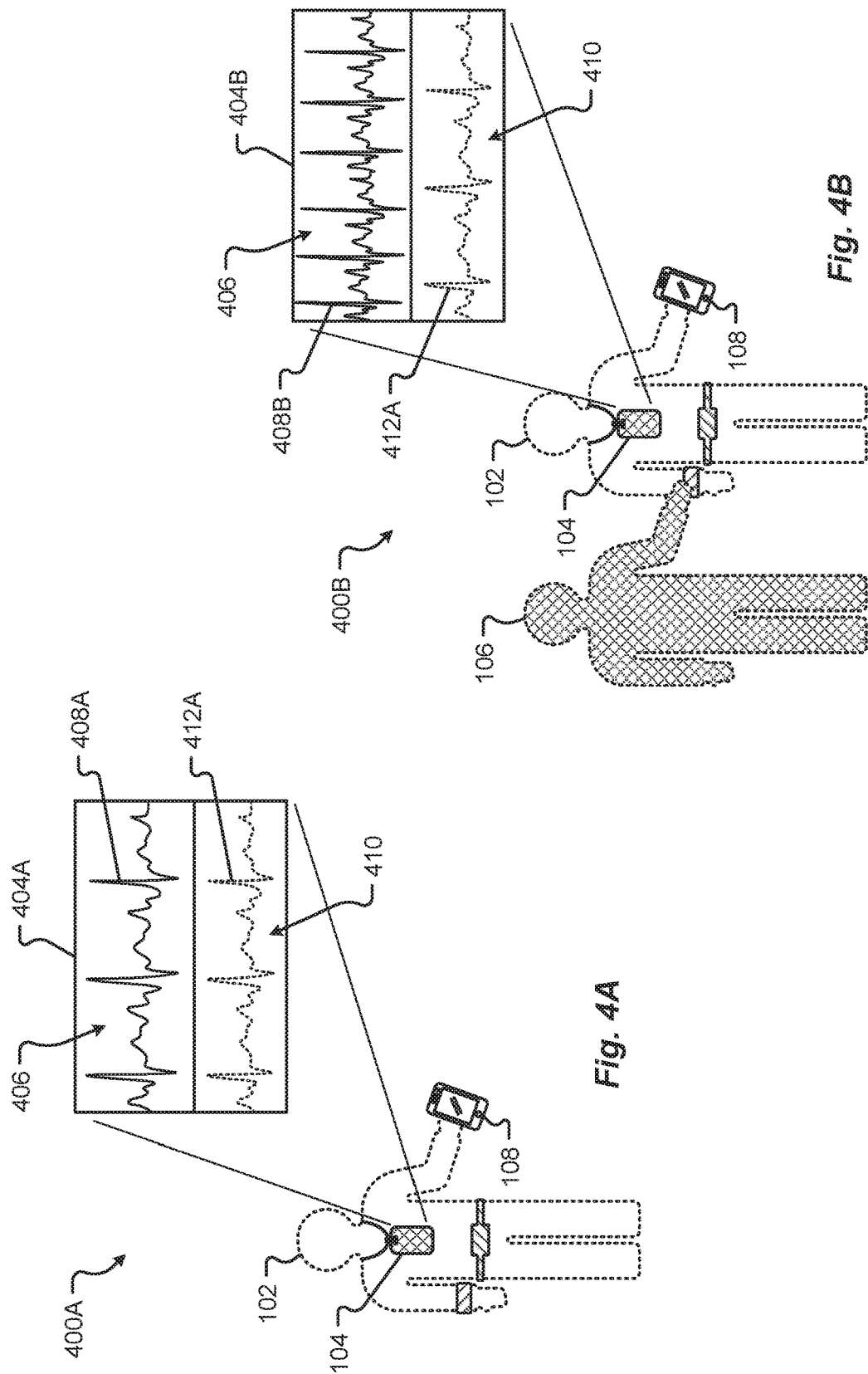
FIG. 4A is a block diagram depicting a first operational condition in accordance with embodiments of the present disclosure.
FIG. 4B is a block diagram depicting a second operational condition in accordance with embodiments of the present disclosure.

Referring now to FIG. 4A, a block diagram depicting a first operational condition 400A associated with a user 102 is shown in accordance with embodiments of the present disclosure. In general, FIG. 4A shows a user 102 having multiple devices 104, 108 with at least one of the devices 104, 108 collecting duress information associated with the user 102. More specifically, the first data set 404A shows first information 408A collected and stored in the measured data field 406 under a normal, non-duress, condition. For example, the first information 408A substantially matches the stored information 412A in the baseline data field 410. The first information 408A is shown graphically as a waveform having a particular shape and characteristics (e.g., amplitudes, periods, wavelengths, etc.) over time. In FIG. 4A, the particular shape and characteristics of the first information 408A may conform to the particular shape and characteristics of the stored baseline information 412A waveform, within one or more limits or thresholds of variation. When the measured data falls within the limits/thresholds of the baseline information, the user 102 may be determined to be in a state of non-duress.

FIG. 4B shows a block diagram depicting a second operational condition 300B associated with a user 102 in accordance with embodiments of the present disclosure. In general, FIG. 4B shows a user 102 having multiple devices 104, 108 with at least one of the devices 104, 108 collecting duress information associated with the user 102. More specifically, the second data set 404B shows second information 408B collected and stored in the measured data field 406 under an abnormal, or duress, condition. For example, the second information 408B deviates from the stored information 412A in the baseline data field 410. The second information 408B is shown graphically as a waveform having a particular shape and characteristics (e.g., amplitudes, periods, wavelengths, etc.) over time. In FIG. 4B, the particular shape and characteristics of the second information 408B may deviate from the particular shape and characteristics of the stored baseline information 412A waveform, and fall outside of one or more limits or thresholds of variation. When the measured data falls outside of the limits/thresholds of the baseline information, the user 102 may be determined to be in a state of duress or be in a duress condition.

For instance, FIG. 4B shows that a criminal, or assailant, 106 has forcefully grasped, jostled, held, or otherwise alarmed the user 102. The force exerted by the assailant 106 may be detected by one or more sensors associated with the wearable device 104 of the user 102. Additionally or alternatively, the heart rate of the user 102 may have increased upon being subjected to the unexpected force. By way of example, the second information 408B may represent the heart rate of the user 102 while under duress. Note that the heightened heart rate in this condition 400B does not conform to the heart rate of the user 102 under a baseline, or normal, condition 400A (e.g., where the normal heart rate is represented by the stored baseline information waveform 412A). It is an aspect of the present disclosure that a health event, or other event absent a criminal 106 interference or other outside influence, may be detected by the wearable device 104 and correlated to a duress condition.

Figure 5:
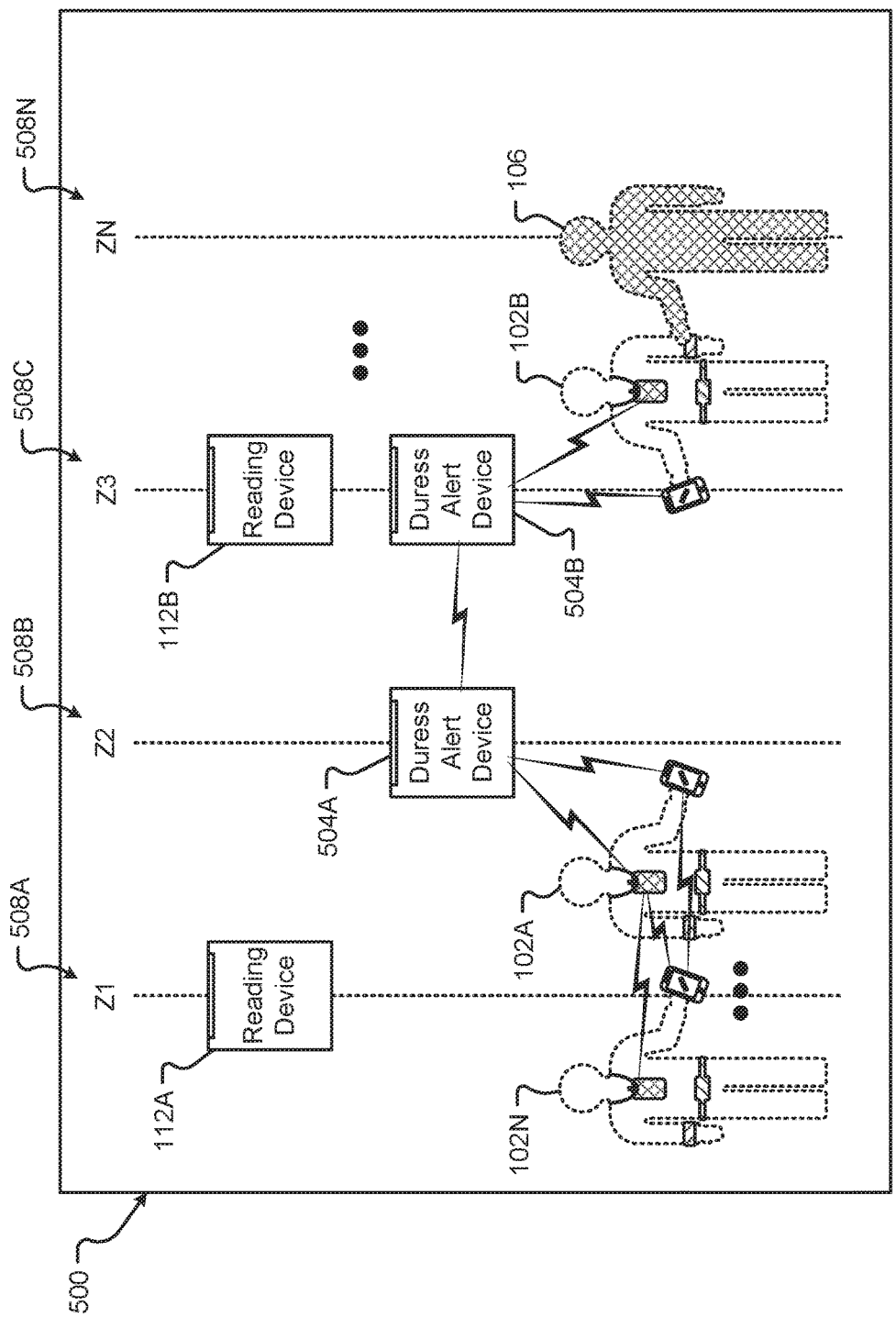
FIG. 5 is a diagram depicting an environment configured to receive duress signals sent from various locations in accordance with embodiments of the present disclosure.

FIG. 5 is a diagram depicting an environment 500 configured to receive duress signals sent from various locations in the environment 500 in accordance with embodiments of the present disclosure. In particular, an environment 500 (e.g., a building, campus, area, space, room, etc.) may be arranged into one or more zones 508A-N, where each zone 508A-N represent a particular location or point in the environment 500. In one embodiment, each zone 508A-N may correspond to a location in the environment 500 that is defined by a distance from a reference point in the environment 500. In some embodiments, the zones 508A-N may correspond to access points, or access controlled points, within an environment 500. In any event, as a user 102 moves in the environment 500, one or more reading devices 112A, 112B, duress alert devices 504A, 504B, or other devices associated with one or more zones 508A-N may be configured to send to and/or receive signals from the wearable devices 104 and mobile communication devices 108 inside the environment 500.

By way of example, user 102B in Zone 3 508C of the environment 500 may be under duress (e.g., attack from a criminal 106, heart failure, health event, fire, etc.). Upon determining that the information received from the wearable sensors qualifies as a duress condition, the wearable device 104 and/or communication device 108 associated with the user 102 may communicate a duress signal to a duress alert device 504B, or other device, in Zone 3 508C. In some embodiments, the duress alert devices 504A-B and/or at least one reading device 112A-B may be communicatively connected to one another in the environment 500. As can be appreciated, the duress signal may be relayed from one device to another inside the environment 500 and even outside the environment 500. In one embodiment, the duress signal and/or an alert about the duress signal may be distributed to devices associated with one or more other users 102A, 102N in the environment 500. In the event that a user 102B has been held hostage by a criminal 106, the duress signal alert may be configured to guide other users 102A, 102N away from the zone of danger, Z3 508C. Additionally or alternatively, in the event that a user 102B has suffered a health event or heart failure the duress signal alert may be configured to guide other users 102A, 102N toward the location (Z3 508C) where the user 102B is suffering duress (e.g., to lend assistance and/or first aid, etc.).

In some embodiments, the duress signal may include the location of the user 102 who is under duress in the environment 500. The location may be retrieved from the location sensor(s) 228 of the wearable device 104 associated with the user 102. Additionally or alternatively, the location of a user 102 may be based on a location of a particular reading device 112 and/or duress alert device 504 that received the duress signal. In any event, the location of the user 102 may be used by one or more components of an access control system 100 to activate/deactivate locks, activate/deactivate lighting, activate/deactivate heating venting and air conditioning (HVAC) equipment, initiate fire suppression equipment, actuate doors/windows, illuminate/signal escape routes, etc., and/or combinations thereof, in one or more specific zones 508A-N of the environment 500.

Figure 6:
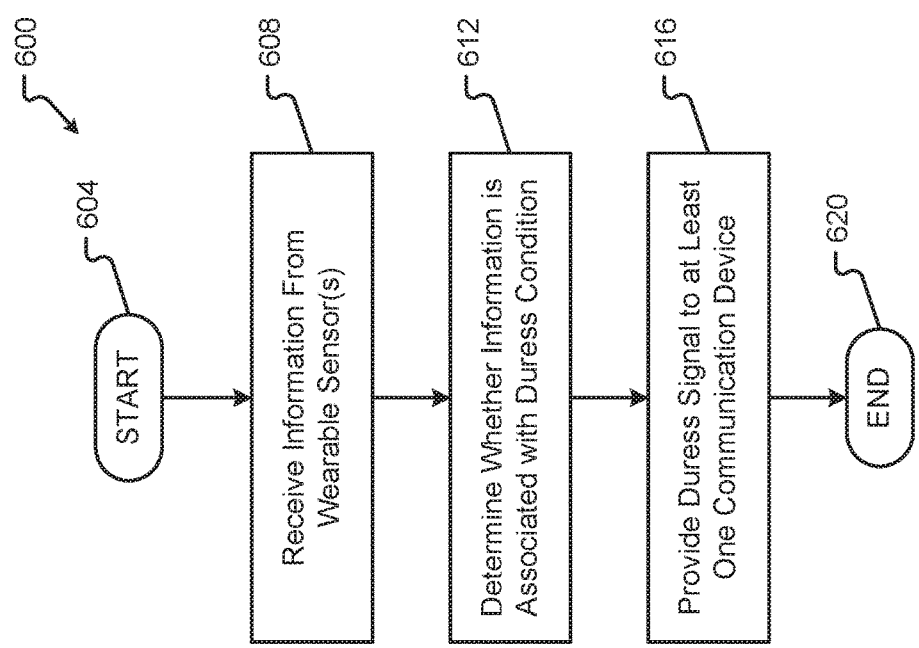
FIG. 6 is a flow chart depicting a method of analyzing received information and providing a duress signal in accordance with embodiments of the present disclosure.

FIG. 6 is a flow chart depicting a method 600 of analyzing received information and providing a duress signal in accordance with embodiments of the present disclosure. While a general order for the steps of the method 600 is shown in FIG. 6, the method 600 can include more or fewer steps or can arrange the order of the steps differently than those shown in FIG. 6. Generally, the method 600 starts with a start operation 604 and ends with an end operation 620. The method 600 can be executed as a set of computer-executable instructions executed by a computer system and encoded or stored on a computer readable medium. Hereinafter, the method 600 shall be explained with reference to the systems, components, modules, environments, software, etc. described in conjunction with FIGS. 1-5.

The method 600 begins at step 604 and proceeds by receiving information from one or more sensors associated with a wearable device 104 (step 608). As provided above, the wearable sensors 220 may include a number of sensors configured to collect information associated with a user 102 and/or an environment associated with the user 102. For example, biometric sensors may collect biometric information of the user 102 such as heart rate, temperature, blood pressure, breathing rate, breathing intensity, heat signature, and the like. The wearable sensors 220 may include microphones, pressure transducers, thermocouples, temperature measuring sensors, humidity detection sensors, smoke sensors, carbon monoxide sensors, and/or the like configured to at least measure or collect information about the environment associated with a user 102. In some embodiments, these sensors may determine a user 102 is in duress without requiring biometric information from the wearable sensors 220. Additionally or alternatively, information from the other sensors of the wearable device 104 (e.g., motion sensors, location sensors, etc.) may be received. In any event, the information from these various sensors may be received by the various components of the wearable device 104, at a reading or duress device 112, 404, a communication device, 124, a server 120, and/or combinations thereof, etc.

Upon receiving the information, the method 600 continues by determining whether the information is associated with a duress condition (step 612). In one embodiment, the collected information may be analyzed and/or compared to threshold or stored data to determine whether a duress condition is satisfied. The stored data may include baseline profiles or thresholds that are associated with a particular user. These baseline profiles may be established by subjecting a particular user to a set of stimuli and measuring responses to the stimuli. The responses may be stored in memory and associated with a particular user as the user's custom baseline profile. In some embodiments, the stimuli may be configured to simulate a stressful or duress condition. This response to the duress condition stimuli may be stored in memory and associated with a particular user as the user's custom duress profile. When the information received substantially matches (e.g., a number of measurable values or data points matching the stored profile within a particular tolerance or variance, etc.) the duress profile and/or when the information received falls outside of predetermined thresholds or variances associated with the baseline profile, the duress condition may be determined.

As can be appreciated, specific duress conditions may correspond to a specific output reported by the information received. For example, a user suffering a heart attack may have specific measurable points along a first electrocardiogram (ECG), while a user who is startled or is suffering from stress may have different measurable points along a second ECG. As another example, a user may be in a smoke filled environment and may begin to choke. While the user's heart rate may remain within certain thresholds, the user's breathing rate may change significantly from a baseline profile, and the other information (e.g., a smoke detection, temperature change, etc.) may indicate a particular duress condition (e.g., smoke inhalation, fire, etc.). In any event, the method 600 may determine a particular duress condition based on a determination of the particular information received when analyzed for measurable points over time. The particular duress condition may be associated with the user, a time, a location, an area, and/or other information. The particular duress condition may be reported as part of a duress signal.

The method 600 continues by providing the duress signal to at least one communication device (step 616). Communication devices may include at least one of a reading device 112, duress alert device 504, server 120, communication device 124, mobile phone, another wearable device 104, mobile device 108, etc. The duress signal may be provided directly by the wearable device 104 and/or indirectly by a mobile device 108 associated with the wearable device 104. In some embodiments, the duress signal may include at least one of an identification of a user 102, identification of a duress condition, a location associated with the duress condition, biometric information, environmental information, and the like. In one embodiment, the duress signal may include an alert configured to notify others of the duress condition. The alert may be configured as an alarm or an informational presentation that can be displayed on a graphical user interface or display. The alarm may include a summary of the duress signal information, recommendations for action, and/or other information. The method 600 ends at step 620.

Figure 7:
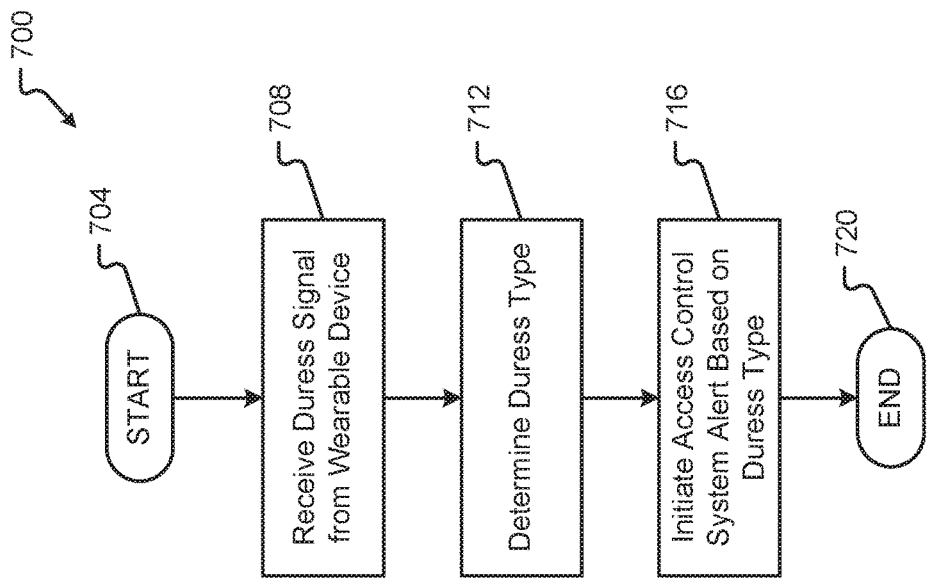
FIG. 7 is a flow chart depicting a method of initiating a duress alert in an access control system in accordance with embodiments of the present disclosure.

FIG. 7 is a flow chart depicting a method of initiating a duress alert in an access control system 100 in accordance with embodiments of the present disclosure. While a general order for the steps of the method 700 is shown in FIG. 7, the method 700 can include more or fewer steps or can arrange the order of the steps differently than those shown in FIG. 7. Generally, the method 700 starts with a start operation 704 and ends with an end operation 720. The method 700 can be executed as a set of computer-executable instructions executed by a computer system and encoded or stored on a computer readable medium. Hereinafter, the method 700 shall be explained with reference to the systems, components, modules, environments, software, etc. described in conjunction with FIGS. 1-6.

The method 700 begins at step 704 and proceeds by receiving a duress signal from a wearable device 104 (step 708). The duress signal may be received from the wearable device 104 and/or a mobile device 108 associated with the wearable device 104 as disclosed above. The duress signal may be received by one or more receiving, or communication, devices such as a reading device 112, duress alert device 404, server 120, communication device 124, mobile phone, another wearable device 104, and/or mobile device 108, etc.

Next, the method 700 continues by determining the duress type associated with the duress signal received (step 712). In some embodiments, this determination may include reviewing an identification of the duress information contained in the duress signal. In one embodiment, determining the duress type may include the receiving device analyzing the information from the wearable sensors that is contained in the duress signal. This analysis may be similar, if not identical, to the determination described in conjunction with step 512 of FIG. 5. The duress type may be determined by the receiving device referring to the identification of the duress condition field in the duress signal data structure.

The method 700 may proceed by initiating at least one access control system alert based on the duress type determined in step 712 (step 716). The alert may be configured as a silent alarm and/or a non-silent alarm. For example, in the event of a hostage taking duress type (e.g., determined based on information from one or more wearable sensors, duress signals, etc.), alerting the hostage taker may cause the hostage taker to increase a level of violence or act more dangerously. In this case, the alarm may be configured to privately, or silently, alert those in close proximity to the hostage taking, while providing a non-silent alarm to those who not in close proximity to the hostage taking. Close proximity may be defined as any proximity where a non-silent alarm can be detected by a hostage taker, criminal, hostile force, or other individual adjacent to the wearable device 104 providing or causing the duress signal.

In some embodiments, the alarm type may be configured to guide individuals or groups toward or away from a location associated with the user under duress. For instance, a user suffering duress from a health condition may require aid, and as such, others may be directed or guided toward the user via the alarm (e.g., providing directions, unlocking doors, illuminating pathways, providing information about the duress, increasing access control authority, increasing access control authority of one or more users, etc.). As another example, the duress type may be determined to be a fire, environmental hazard, or other thread, in a particular location, and others may be directed away from the location associated with the user under duress. Directing others away from the location may include providing directions, unlocking doors, illuminating pathways, providing information about the hazard or threat, increasing access control authority of one or more users, etc.

In one embodiments, the access control authority of the user under duress may be restricted, increased, or otherwise altered based on the duress type. For instance, in the hostage taking scenario provided above, trapping the user and the hostage taker in a particular location in an access control environment reduces the ability of the parties to move freely, while allowing first responders to address the threat in a known area. The user under duress and the hostage taker may be trapped by selectively allowing access to particular areas in the environment and/or restricting access altogether.

The alert may be distributed to one or more communication devices (e.g., wearable devices 104, mobile devices 108, and/or communication devices 124, etc.) associated with users in an access control system, a third party, an access server 120, and the like. In some embodiments, the alert may be provided in response to a user entering a communication range of a reading device 112, a duress alert device 504, and/or other communication device 124 associated with the access control system 100. The alert may be presented to a display or graphical user interface associated with the communication device. In one embodiment, the presentation on the display may include any of the duress information disclosed herein. The method 700 ends at step 720.

The exemplary systems and methods of this disclosure have been described in relation to wearable devices, systems, and methods in an access control system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a wearable device, a mobile device, a reading device, a communication device, and/or an access server of an access control system, etc.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Embodiments include a method, comprising: receiving, from a wearable device associated with a user in an access control system, sensor information representing a condition of the user; determining whether the sensor information indicates that the user is under duress; determining a duress condition associated with the user; and providing, in response to determining the duress condition, a duress signal to a communication device of the access control system.

Aspects of the above method include wherein providing the duress signal includes sending or transmitting the duress signal. Aspects of the above method include wherein determining whether the sensor information indicates that the user is under duress further comprises: analyzing user biometric information from the received sensor information for variations from a predetermined user baseline profile established for the user. Aspects of the above method include wherein determining whether the sensor information indicates that the user is under duress further comprises: analyzing user environmental information from the received sensor information for variations from a predetermined environmental baseline profile established for an environment associated with the user. Aspects of the above method include wherein determining the duress condition associated with the user, further comprises: comparing the user biometric information and the user environmental information with predetermined duress condition profiles, wherein each predetermined duress condition profile defines a unique duress condition. Aspects of the above method include wherein the predetermined duress condition profiles include at least one of a fire, hazard, assault, health incident, heart attack, carbon monoxide detection, gas detection, and flood. Aspects of the above method include wherein the duress signal is provided to a display associated with the communication device in the access control system, and wherein the communication device includes at least one of a reading device, a mobile device, another wearable device, and an access server. Aspects of the above method include wherein the duress signal is provided by a mobile device associated with the wearable device. Aspects of the above method include wherein the duress signal includes information configured to alter an access control authority of one or more other users in the access control system. Aspects of the above method include wherein the duress signal in provided in response to receiving, at the wearable device, an interrogation signal from a reading device in the access control system. Aspects of the above method include wherein prior to determining the duress condition, the method further comprises: receiving, from the wearable device, force measurement information corresponding to a force of impact recorded by the wearable device. Aspects of the above method include wherein determining the duress condition associated with the user further comprises: determining a temporal relationship of the force measurement information to the sensor information representing the condition of the user. Aspects of the above method include determining a physical assault duress condition exists when the temporal relationship indicates that the force of impact precedes an increase in measured heart rate of the user and determining a health event duress condition exists when the temporal relationship indicates that a decrease in measured heart rate of the user precedes the force of impact. Aspects of the above method include wherein the access control system limits or denies access to an area associated with the duress condition.

Embodiments include a non-transitory computer readable medium having stored thereon instructions that, when executed by a processor, performs the above method or methods.

Embodiments include an access control system, comprising: a reading device configured to receive duress signal information transmitted via at least one wearable device in the access control system; a wearable device associated with a user of the access control system, comprising: a memory having sensor information stored thereon; and a communications module configured to enable communications between at least one of the reading device and a mobile device; and a processor configured to determine whether the sensor information indicates that the user is under duress, determine a duress condition associated with the user, and provide, via the communications module and in response to determining the duress condition, a duress signal to the reading device of the access control system.

Aspects of the above access control system further comprise: a duress alert device configured to transmit an alert about the duress condition to one or more other wearable devices, mobile devices, and/or reading devices in the access control system upon receiving the duress signal from the wearable device. Aspects of the above access control system include wherein the alert is configured as a silent alarm. Aspects of the above access control system include wherein the alert is transmitted to all system associated wearable devices in a communication range of the duress alert device. Aspects of the above access control system include wherein the alert is transmitted to all system associated wearable devices simultaneously.

Embodiments include a method, comprising: receiving, at a communication device of an access control system, a duress signal provided by a wearable device associated with a user, the duress signal indicating that the user is under duress; determining, based at least partially on information in the duress signal, a duress type associated with the user; generating an alert based on the duress type determined; and providing the alert to at least one other communication device associated with the access control system.

Aspects of the above method further comprise: controlling, based at least partially on the duress type, at least one access control point associated with the access control system. Aspects of the above method include wherein the alert is a silent alert configured to present information about the duress type to a selected user via the at least one other communication device such that only the selected user receives the presentation of the information. Aspects of the above method include wherein the alert includes instructions directing another user associated with the at least one other communication device toward or away from the user under duress. Aspects of the above method further comprise: controlling, based at least partially on the duress type, at least one of an environmental illumination, heating venting and air conditioning output, and lock status associated with one or more components in the access control system and in an environment proximate to the user under duress.

Any of the steps, functions, and operations discussed herein can be performed continuously and automatically.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

What is claimed is:

1. A method, comprising:
   receiving, from a wearable device associated with a user in an access control system, sensor information representing a condition of the user;
   determining whether the sensor information indicates that the user is under duress;
   determining a duress condition associated with the user;
   providing, in response to determining the duress condition, a duress signal to a communication device of the access control system, wherein the duress signal includes information configured to alter an access control authority of one or more other users in the access control system;
   determining, based at least partially on the duress signal, to limit or grant access via a reading device of the access control system;
   determining a position of the user within the access control system; and
   controlling one or more assets within a predetermined proximity of the position of the user based, at least in part, on the duress condition.

2. The method of claim 1, wherein determining whether the sensor information indicates that the user is under duress further comprises:
   analyzing user biometric information from the received sensor information for variations from a predetermined user baseline profile established for the user.

3. The method of claim 2, wherein determining whether the sensor information indicates that the user is under duress further comprises:
   analyzing user environmental information from the received sensor information for variations from a predetermined environmental baseline profile established for an environment associated with the user.

4. The method of claim 3, wherein determining the duress condition associated with the user further comprises:
   comparing the user biometric information and the user environmental information with predetermined duress condition profiles, wherein each predetermined duress condition profile defines a unique duress condition.

5. The method of claim 4, wherein the predetermined duress condition profiles include at least one of a fire, hazard, assault, health incident, heart attack, carbon monoxide detection, gas detection, and flood.

6. The method of claim 1, wherein the duress signal is provided to a display associated with the communication device in the access control system, and wherein the communication device includes at least one of another reading device, a mobile device, another wearable device, and an access server.

7. The method of claim 1, wherein the duress signal is provided by a mobile device associated with the wearable device.

8. The method of claim 1, wherein the duress signal is provided in response to receiving, at the wearable device, an interrogation signal from a reading device in the access control system.

9. The method of claim 1, wherein prior to determining the duress condition, the method further comprises:
   receiving, from the wearable device, force measurement information corresponding to a force of impact recorded by the wearable device.

10. The method of claim 9, wherein determining the duress condition associated with the user further comprises:
    determining a temporal relationship of the force measurement information to the sensor information representing the condition of the user.

11. A non-transitory computer readable medium having stored thereon instructions that, when executed by a processor, perform the method of claim 7.

12. An access control system, comprising:
    a reading device configured to receive duress signal information transmitted via at least one wearable device in the access control system;
    a wearable device associated with a user of the access control system, comprising:
      a memory having sensor information stored thereon; and
      a communications module configured to enable communications between at least one of the reading device and a mobile device; and
    a processor configured to determine whether the sensor information indicates that the user is under duress, determine a duress condition associated with the user, provide, via the communications module and in response to determining the duress condition, a duress signal to the reading device of the access control system, wherein the duress signal includes information configured to alter an access control authority of one or more other users in the access control system, determine, based at least partially on the duress signal, to limit or grant access via the reading device of the access control system, determine a position of the user within the access control system, and control one or more assets within a predetermined proximity of the position of the user based, at least in part, on the duress condition.

13. The access control system of claim 12, further comprising:
    a duress alert device configured to transmit an alert about the duress condition to one or more other wearable devices, mobile devices, and/or reading devices in the access control system upon receiving the duress signal from the wearable device.

14. The access control system of claim 13, wherein the alert is configured as a silent alarm and configured to guide other users away from a zone of danger associated with the duress signal.

15. A method comprising:
    receiving, at a communication device of an access control system, a duress signal provided by a wearable device associated with a user, the duress signal indicating that the user is under duress, wherein the duress signal includes information configured to alter an access control authority of one or more other users in the access control system;
    determining, based at least partially on information in the duress signal, a duress type associated with the user;
    determining a position of the user within the access control system;

generating an alert based on the duress type determined;

providing the alert to at least one other communication device associated with the access control system and within a predetermined proximity of the position of the user; and determine, based at least partially on the duress type determined, to limit or grant access via a reading device of the access control system.

16. The method of claim 15, further comprising:

controlling, based at least partially on the duress type, at least one access control point associated with the access control system.

17. The method of claim 15, wherein the alert is a silent alert configured to present information about the duress type to a selected user via the at least one other communication device such that only the selected user receives the presentation of the information.

18. The method of claim 15, wherein the alert includes instructions directing another user associated with the at least one other communication device away from the user under duress.

19. The method of claim 18, further comprising:

controlling, based at least partially on the duress type, at least one of an environmental illumination, heating venting and air conditioning output, and physical lock status associated with one or more components in the access control system and in an environment proximate to the user under duress.

* * * * *